Patented Nov. 10, 1942

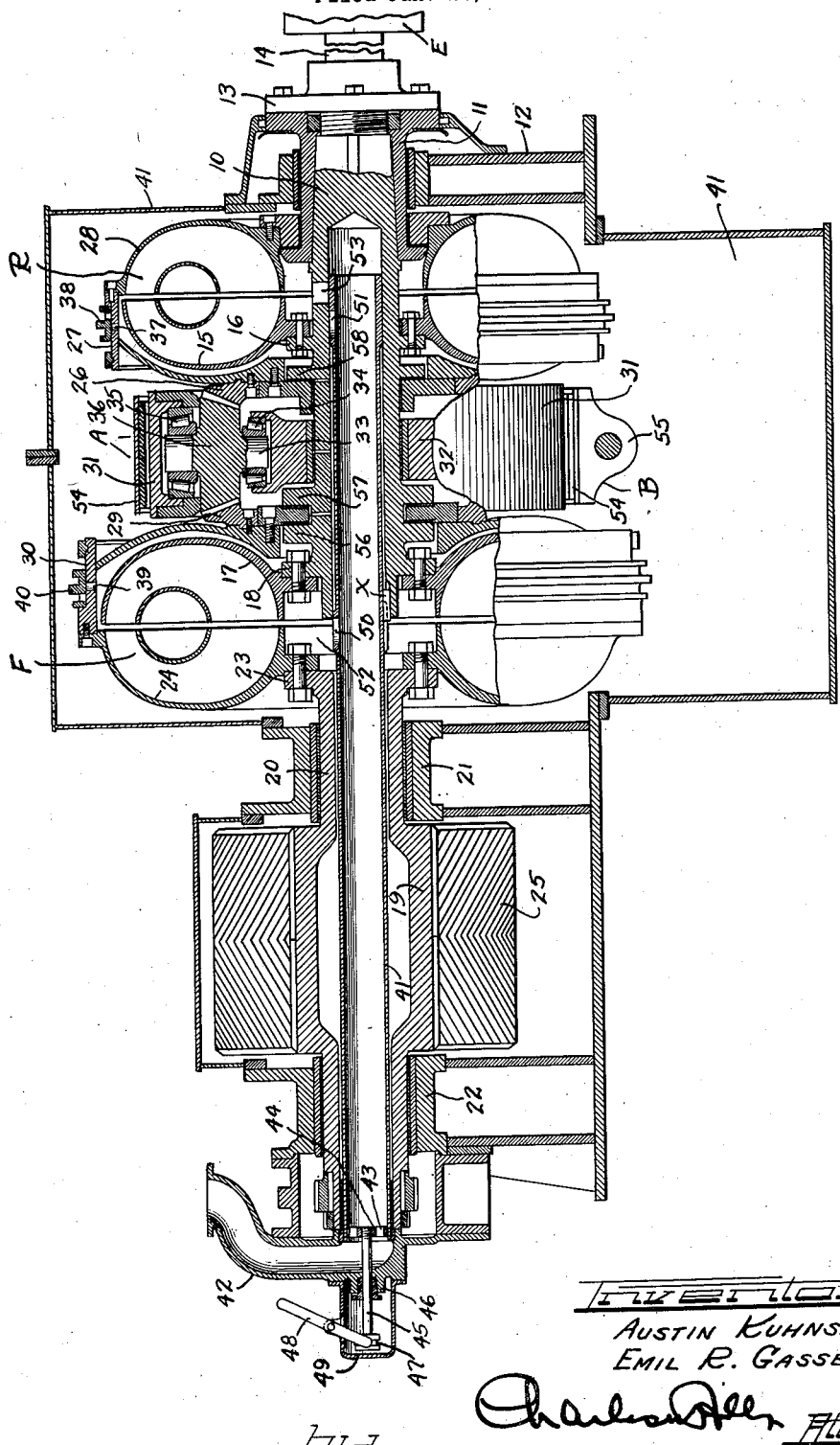

2,301,294

UNITED STATES PATENT OFFICE 2,301,294

HYDRAULIC CLUTCH DRIVING ASSEMBLY

Austin Kuhns and Emil R. Gasser, Buffalo, N. Y., assignors, by mesne assignments, to General Motors Corporation, Detroit, Mich., a corporation of Delaware Application January 24, 1941, Serial No. 375,775

2 Claims. (Cl. 74—189.5)

This invention relates to hydraulic clutch driving assembly in which a driving source such as a Diesel engine or electric motor, or other suitable driving source, transmits driving power through hydraulic clutch assembly. The invention is of particular adaptability and advantage in propulsion systems such as marine installation for the rotation in forward or reverse direction of the propeller shaft without having to reverse the direction of the driving source or even stop the driving source.

The various features of the invention are incorporated in the drawing and will become apparent as the description proceeds.

The drawing comprises one figure which is a vertical diametral section of a complete assembly for driving a driving pinion.

On the arrangement shown, a driving shaft 10 is keyed to a bushing 11 supported in a suitable bearing structure 12, the bushing being connected through a suitable coupling means 13 with the driving shaft 14 of a driving source E which may be a Diesel engine.

The shaft 10 extends axially of a forward drive hydraulic clutch F, and a reverse drive hydraulic clutch R. The driving or impeller element 15 of the clutch R is bolted to a flange 16 on the shaft 10, and the driving or impeller element 17 of the clutch F is bolted to the flange 18 on the shaft so that the impeller elements of both clutches are always rotated with the shaft.

A driving pinion 19 is supported on a shaft 20 which is journaled in bearing structures 21 and 22, and at its inner end the shaft 20 has the flange 23 to which the driven or runner element 24 of the clutch F is bolted. In a marine propulsion system, the pinion 19 will mesh with a gear 25 on a shaft which is coupled to the propeller shaft.

When the clutch F is provided with hydraulic working fluid, the rotation of the primary or driving element 17 by the shaft 10 will be hydraulically transmitted to the runner element 24 and the shaft 20 for driving of the pinion 19 and the gear 25 for forward propulsion by the propeller.

Located between the clutches F and R and concentric with the shaft 10 is a reversing gearing assembly A. A beveled gear 26 is secured to the clutch housing 27 which is secured to rotate with the runner or driven element 28 of the clutch R, while a similar gear 29 is secured to the housing 30 which is connected to rotate with the driven or runner element 24 of the clutch F.

Between the gears 26 and 29 is the pinion supporting frame 31 having the hub 32 surrounding the shaft 10. Extending between the hub and the outer wall of the frame are a number of shafts 33 journaled in bearings 34 and 35 and mounting bevel pinions 36 which mesh with the gears 26 and 29. When the clutch F is empty and the clutch R is supplied with working fluid, the rotation of the impeller element 15 of the clutch R will be hydraulically transmitted to the runner element 28 and through the housing 27 to the gear 26, and if the pinion frame 31 is stationary, the pinions will drive the gear 29 in reverse direction, this reverse driving direction being communicated through the housing 30 and runner element of the clutch F to the shaft 20 for reverse rotation of the driving pinion 19. The clutch R has dumping outlets 37 normally closed by the ring valve 38 on the housing 27, and the clutch F has dumping outlets 39 normally closed by the valve ring 40 on the housing 30. When it is desired to empty either clutch, the valve ring therefor is shifted axially to expose the dumping outlets, the discharged fluid being received in the housing 41 surrounding the clutch assembly.

The driving shaft 10 and the pinion shaft 20 are bored to receive the valve 41 in the form of a tube. A stationary fluid inlet housing 42 is mounted adjacent the outer end of the pinion shaft and communicates with the interior of the valve tube through passages 43 in the head 44 secured in the outer end of the valve. A stem 45 extending from the valve head is journalled in the housing 42 and is surrounded by a stuffing box 46 and terminates in a grooved collar 47 engageable by a lever 48 fulcrumed on the frame 49 mounted on the inlet 42.

The valve tube extends into the bore of the shaft 10 for axial shift therein but to rotate therewith as by virtue of a spline connection X and the tube has ports 50 and 51 for registration with the inlets 52 and 53 respectively for the clutches F and R. As shown on the drawing, the valve has been shifted to its outer position for connection of its port 50 with the inlet for the clutch F, and with its port 51 withdrawn from the inlet 53 of the clutch R. This is the setting for forward drive of the pinion 19 by the clutch F, the clutch R having been emptied. This forward drive is from the engine through the shaft 10 and the housing 30 and runner element 24 to the pinion shaft 20.

If reverse drive is desired, the valve 41 is shifted inwardly by operation of the lever 48 to disconnect at port 50 from the clutch F and to connect at port 51 to the inlet 53 of the clutch R, and the dumping valve 40 of the clutch F is opened for draining of this clutch while the clutch R is being supplied with working fluid.

The impeller element 15 of the clutch R will now be rotated by the engine and, if the pinion frame 31 is stationarily mounted, or is held stationary, the gear 26 which will rotate with the driven or runner element 28 of the clutch R, will rotate the pinions 36 for reverse rotation of the gear 29 and the runner structure 24 of the clutch F and the pinion shaft 20 for reverse operation of the pinion 19.

For reverse drive by the clutch R, the reversing pinion frame 31 must be held stationary. However, if this frame is stationary during forward driving by the clutch F, the rotation of the driven element 24 of this clutch will be transmitted in reverse direction by the gear 26 to the runner element of the clutch R, and this runner element thus driven, and the impeller element of clutch R driven by the shaft 10, will be rotated in opposite directions, and although the clutch R is emptied of hydraulic working fluid, it will be filled with air and a resulting resistance is imposed on the operation of the clutch F. To avoid such windage loss in connection with the forward drive clutch F, brake mechanism B is provided for the reversing pinion frame 31. Any suitable form of brake structure may be provided. As shown the brake comprises a brake band 54 around the cylindrical outer side of the frame 31 and anchored to a stationary support 55. For forward drive by the clutch F, the brake band is released from the frame 31 so that the frame 31 may rotate idly without exerting any driving effort on the runner element of the reversing clutch R and therefore eliminating windage loss. For reverse driving by the clutch R, the brake band is set to hold the frame 31 stationary for reverse driving of the gear 29 and the runner structure of the clutch F and the pinion 19. During such reverse rotation of the runner element of clutch F, the impeller element will be driven in the opposite direction by the shaft 10 and windage resistance will be created, but such resistance is not of such importance during reverse driving. In installations where it is not necessary to eliminate windage losses during forward driving, the reversing pinion frame 31 may be permanently stationarily supported.

The inner portion of the gear 29 is received between flanges 56 and 57 on the shaft 10, and the gear 26 is backed up by a flange 58 on the shaft 10. These flanges will hold the gears in axial alignment relative to the reversing pinions, and will also form thrust bearings for maintaining the impeller and rotor elements of each clutch in proper relative position against the axial thrust of the working fluid during operation of the clutches.

With the improved driving assembly and operation shown and described, the driving source E can always rotate in the same direction and need not be stopped during the process of adapting the clutches for either forward or reverse drive.

We have shown practical and efficient embodiment of the features of our invention but do not desire to be limited to the exact construction, arrangement and operation shown and described as changes and modifications may be made without departing from the scope of the invention.

We claim as follows:

1. A hydraulic driving assembly comprising a forward driving hydraulic clutch and a reverse driving hydraulic clutch each having an impeller element and a runner element and provided with means for dumping hydraulic working fluid therefrom, a driving shaft connected with the impeller elements of said clutches, a driven shaft in axial alignment with said driving shaft and connected to the runner element of said forward driving clutch whereby when only said forward driving clutch is supplied with working fluid said driven shaft will be driven in forward direction, a reversing gearing assembly connecting the runner elements of said clutches and effective when only said reverse driving clutch is supplied with hydraulic fluid to transmit the rotation of the runner element of said clutch for drive in reverse direction of the runner element of said forward driving clutch and the driven shaft connected therewith, said driven shaft having an axial bore therethrough and said driving shaft having an axial bore, a valve tube extending through said driven shaft bore and into said driving shaft bore, said valve tube being axially shiftable in said bores and being connected to said driving shaft to rotate therewith, a fluid inlet for the outer end of said valve tube, said valve tube having outlet ports and said clutches having fluid inlets, and means connected with the outer end of said valve tube for effecting shift thereof for setting of the ports for selective filling of said clutches.

2. A hydraulic driving assembly comprising a forward driving hydraulic clutch and a reverse driving hydraulic clutch each having an impeller element and a runner element and provided with means for dumping hydraulic working fluid therefrom, a driving shaft connected with the impeller elements of said clutches, a driven shaft in axial alignment with said driving shaft and connected to the runner element of said forward driving clutch whereby when only said forward driving clutch is supplied with working fluid said driven shaft will be driven in forward direction, a reversing gearing assembly connecting the runner elements of said clutches and effective when only said reverse driving clutch is supplied with hydraulic fluid to transmit the rotation of the runner element of said clutch for drive in reverse direction of the runner element of said forward driving clutch and the driven shaft connected therewith, said shafts being bored to provide a valve chamber, a valve tube shiftable axially in said chamber but being connected to said driving shaft to rotate therewith, a fluid supply inlet connecting with the outer end of said valve tube for the flow of fluid through said tube, said valve tube having outlet ports and said clutches having inlet passages, and means for shifting said valve tube for setting of said ports for selective filling of said clutches.

AUSTIN KUHNS.
EMIL R. GASSER.